March 11, 1947.  T. E. HORST  2,417,163

CODING AND DECODING APPARATUS

Filed Feb. 28, 1944

INVENTOR.
Tallmon E. Horst
BY
ATTYS.

Patented Mar. 11, 1947

2,417,163

UNITED STATES PATENT OFFICE 2,417,163

CODING AND DECODING APPARATUS

Tallmon E. Horst, Des Plaines, Ill.

Application February 23, 1944, Serial No. 524,332

1 Claim. (Cl. 35—2)

The present invention relates to apparatus and devices for coding and decoding visible information such, for example, as pictures, designs and written or printed messages. It is the principal purpose of the invention to provide means whereby the original information, whether it be a pictorial or design representation or printed or written matter, is separately placed upon one master translucent sheet and a multiplicity of individual sheets which are relatively unintelligible except when used with the master sheet. The means are particularly adapted for use in child education and similar uses where the practice of the invention results in stimulating the interest of the child by presenting a sort of game to the child. The invention however is not limited to this particular use as it may be utilized in connection with games for adults as well as children, and for various other purposes than purely education.

Basically the invention contemplates the breaking down of the information to be portrayed to the ultimate user into one group of strokes or lines on a master translucent sheet, which strokes or lines are similar and which occur repetitively in information of the character to be portrayed, the remainder of the information being placed upon a sheet which is individual to the particular information that is to be transmitted. The user of the devices possesses a master translucent sheet and utilizes this sheet with one or more of the individual sheets which usually are opaque to obtain the final decoding or visual reproduction of the information originally broken down into the component parts.

In breaking down the original picture, design or legend all of the lines running in or nearly in the direction of the lines on the master sheet are subtracted in producing the individual sheet. The individual sheets can then be reproduced by photographic or printing processes to the desired number, it being preferable of course that the reproductions shall carry the same weight of line as the weight of line used upon the master sheet which contains the subtracted lines.

The specific features and advantages of the invention will appear more fully from the following description, reference being had to the accompanying drawings wherein a preferred form of the invention is shown. It is to be understood however that the drawings and description are illustrative only and are not to be taken as limiting the invention except insofar as it is limited by the claims.

Figure 1:
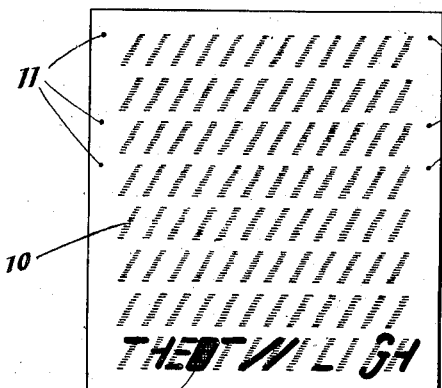
Fig. 1 is a representation of an original sheet upon which a message is to be coded.

Referring now in detail to the drawings, in practicing this invention I provide work sheets such as are shown in Fig. 1 with a multiplicity of parallel uniformly spaced lines 10 which are of a suitable color, such as light blue, that will not reproduce in a photographic process. These lines may be printed or otherwise formed upon the work sheet of Fig. 1 and this work sheet is likewise provided with two series of registering dots indicated at 11 and 12.

Now in order to prepare the visible information I supply additional marks on the work sheet of Fig. 1 so as to make, with the light blue lines, a completed picture, legend or design. The bottom line in Fig. 1 has the additional lines filled in thereon and it will be evident that by subtracting all of the lines that coincide with or nearly coincide with the lines 10 from the legend one can build up an individual sheet such as is shown in Fig. 2.

Particularly in the making of sheets containing messages in words it is advisable to provide some means of spacing words apart which will add nothing to the individual sheet but which will cooperate in the final decoding to separate words and make the message more readily readable. In Fig. 2 of the drawings a sheet 13 photographically reproduced from the work sheet of Fig. 1 utilizes parallelograms 14 in black as the separating means between individual words that are to be part of the final message. The sections on the work sheet of Fig. 1 are shown blacked out, as indicated at 15, so as to reproduce the parts 14 on the sheet of Fig. 2. The reproduced sheet will also carry registering dots 16 and 17 corresponding to the dots 11 and 12 on the work sheet of Fig. 1.

Figure 3:
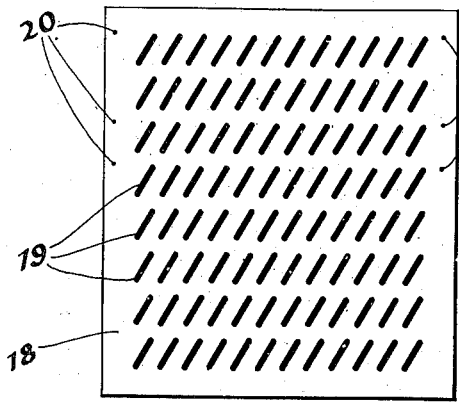
Fig. 3 illustrates the master decoding sheet.

Referring now to Fig. 3, this figure illustrates a master decoding sheet 18 which is provided with a plurality of black lines 19 spaced exactly like the lines 10 on the work sheet of Fig. 1. This sheet likewise carries registering dots 20 and 21 arranged and spaced the same as the registering dots 11, 12, 16 and 17. The sheet of Fig. 3 however must be translucent to a sufficient extent to enable one to see through it and observe the lines 19 as well as the various lines such as 22 on the sheet 13 placed beneath the translucent sheet of Fig. 3. By the use of glassine or similar or fully transparent material the lines 19 can be placed on the front side of the sheet when the back side of the sheet is placed against an individual sheet 13. However, the invention finds greater application where the master sheet having the lines 19 is of a material that is not so completely transparent. Such a sheet, for example, can be made of tracing paper, and in that case the lines 19 are placed on the side of the master sheet which faces the individual sheet in order that the observer will see the lines on the master sheet and the information on the individual sheet through the same obstruction.

Figure 2:
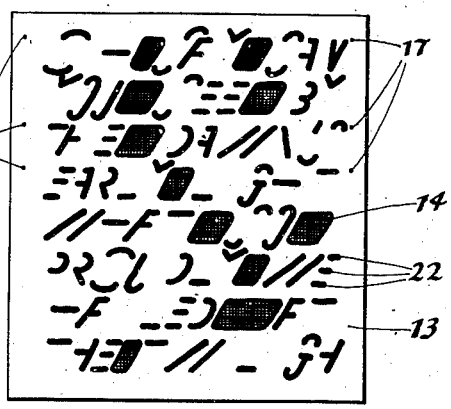
Fig. 2 illustrates the production of an individual sheet by a suitable photographic process from the coded sheet shown in Fig. 1.
Figure 4:
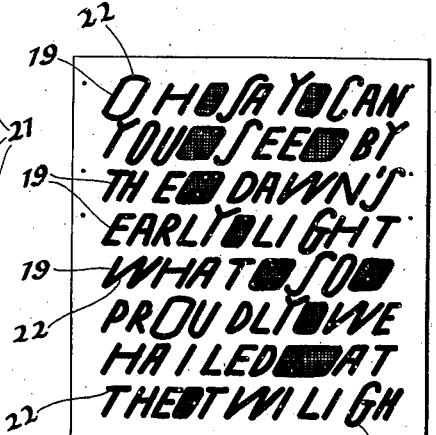
Fig. 4 illustrates the resulting decoded message when the sheet of Fig. 2 and the sheet of Fig. 3 are placed together with the Fig. 3 sheet on top.

The master sheet of Fig. 3 is superposed on the sheet 13 of Fig. 2 with the registering dots 20—21 aligned with the registering dots 16—17. The result is a completed visible picture, design or legend such as is shown in Fig. 4. I have numbered on Fig. 4 a number of the lines 22 to indicate that they are visible through the transparent sheet of Fig. 3, and likewise several of the lines 19 to indicate that they are located on the surface of the transparent sheet.

As a further extension of this idea for the purposes of games and the like the sheet 18 may be made sufficiently opaque as to mask entirely in ordinary light the lines on the back side thereof, and such a sheet when placed directly in contact with the sheet 13 of Fig. 2 and secured thereto would give a sheet plain on both sides, but one which could be caused to disclose the completed message by placing it over a strong light.

I find that the most effective and the most economic device for my purpose is a sheet 18 which is semi-transparent and which contains vertical or nearly vertical spaced parallel lines on the surface thereof. The sheet 13 which works best therewith is a corresponding reproduction from a work sheet 10 from which all of the lines that are vertical or nearly vertical have been subtracted with all other lines being placed thereon together with suitable areas 14 either blacked out entirely or otherwise made to match with the lines 19 to separate parts of the finished legend. In class work for educational purposes the children are provided with master sheets 18 and are then given individual messages and required to match them with the master sheets in order to read the completed message. The sheets 13 are so unintelligible and strange in their appearance as to be attractive to the children and when these sheets can be made to give up actual readable information the child's interest is immediately aroused so that it is much easier to hold his attention long enough to fix the message in his mind.

From the foregoing description it is believed that the nature and advantages of the present invention will be readily apparent to those skilled in this art.

Having thus described my invention, what I claim as new and desire to secure by Letters Patent is:

In combination, a substantially transparent sheet having a plurality of uniformly spaced parallel lines of uniform length and oriented in a substantially vertical direction and arranged in horizontal rows, and a second sheet adapted to register therewith and provided with partial letter characters selected from an alphabet whereof the letters have substantially vertical components which letter characters are complete except for the omission of one or more of said vertical components, said partial letter characters being characterized in form and spacing by a unit spacing between said omitted vertical components so that each one of a particular group of said parallel lines will be utilized to complete a corresponding group of said partial letter characters when said transparent sheet is placed in registry over said second sheet, whereby said second sheet can be utilized as a coded message, and said transparent sheet can be utilized as a decoding device.

TALLMON E. HORST.

REFERENCES CITED

The following references are of record in the file of this patent:

UNITED STATES PATENTS

| Number | Name | Date |
|---|---|---|
| 166,761 | Flamm | Aug. 17, 1875 |
| 1,673,659 | Anderson | June 12, 1928 |
| 2,220,527 | Kroner | Nov. 5, 1940 |
| 1,505,079 | Mills | Aug. 12, 1924 |
| 1,610,806 | Moore | Dec. 14, 1926 |
| 2,280,609 | Williamson | Apr. 21, 1942 |